United States Patent [19]

Hill et al.

[11] Patent Number: 4,474,427
[45] Date of Patent: Oct. 2, 1984

[54] OPTICAL FIBER REFLECTIVE FILTER

[75] Inventors: Kenneth O. Hill, Kanata; Brian S. Kawasaki, Carleton Place; Derwyn C. Johnson; Yoshimasa Fujii, both of Ottawa, all of Canada

[73] Assignee: Canadian Patents & Development Limited, Ottawa, Canada

[21] Appl. No.: 36,503

[22] Filed: May 7, 1979

[51] Int. Cl.³ ............................................. G02B 5/172
[52] U.S. Cl. ............................ 350/96.30; 350/96.29; 350/320
[58] Field of Search ............... 350/96.29, 96.30, 96.31, 350/96.34, 163, 311, 316, 320, 353

[56] References Cited

U.S. PATENT DOCUMENTS

| | | | |
|---|---|---|---|
| 3,308,394 | 3/1967 | Snitzer et al. | 350/96.29 X |
| 3,355,674 | 11/1967 | Hardy | 350/96.29 X |
| 3,600,062 | 8/1971 | Schineller et al. | 350/96.30 X |
| 3,705,992 | 12/1972 | Ippen et al. | 350/96.29 X |
| 3,814,498 | 6/1974 | Tomlinson et al. | 350/96.19 |
| 3,884,550 | 5/1975 | Maurer et al. | 350/96.30 |
| 3,891,302 | 6/1975 | Dabby et al. | 350/96.19 |
| 3,909,110 | 9/1975 | Marcuse | 350/96.15 |
| 3,916,182 | 10/1975 | Dabby et al. | 250/199 |
| 3,957,343 | 5/1976 | Dyott et al. | 350/96.29 |
| 4,093,343 | 6/1978 | Hargrove | 350/96.30 |
| 4,097,258 | 6/1978 | Horikawa et al. | 350/96.30 X |
| 4,107,628 | 8/1978 | Hill et al. | 350/96.30 X |
| 4,163,601 | 8/1979 | Olshansky | 350/96.31 |
| 4,179,187 | 12/1979 | Maurer | 350/96.30 |

FOREIGN PATENT DOCUMENTS

2632861  1/1978  Fed. Rep. of Germany ... 350/96.30

OTHER PUBLICATIONS

Schineller et al., "Development of a Wide-Angle Narrow-Band Optical Filter", *Manuf. Optician Intn'l.*, vol. 21, No. 3, Sep. 1968, pp. 146, 148.
Nagano et al., "Change of the Refractive Index in an Optical Fiber . . . ", *Applied Optics*, vol. 17, No. 13, Jul. 1978, pp. 2080-2085.
Dabby et al., "High-Frequency Cutoff Periodic Dielectric Waveguides", *Appl. Phys. Lett.*, vol. 22, No. 4, Feb. 1973, pp. 190-191.

*Primary Examiner*—John D. Lee
*Attorney, Agent, or Firm*—Edward Rymek

[57] ABSTRACT

The optical reflective filter is made from a photosensitive optical fiber having a cladding and a core including germanium. Refractive index perturbations are light induced in the fiber in the region of the guided light. The perturbations can be made to have a constant or a varying periodicity, or a series of constant periodicities. The filters are made from single mode or low order mode fibers having germanium doped silica or germania cores. The center frequency for reflective band or bands has a wavelength in the 400 nm to 550 nm range. The reflective band or bands in the filter can be shifted by stretching the filter.

17 Claims, 5 Drawing Figures

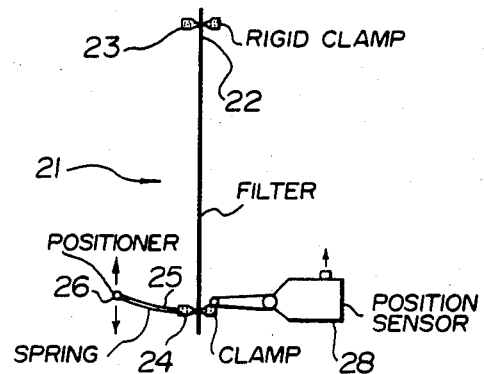
FIG. 4
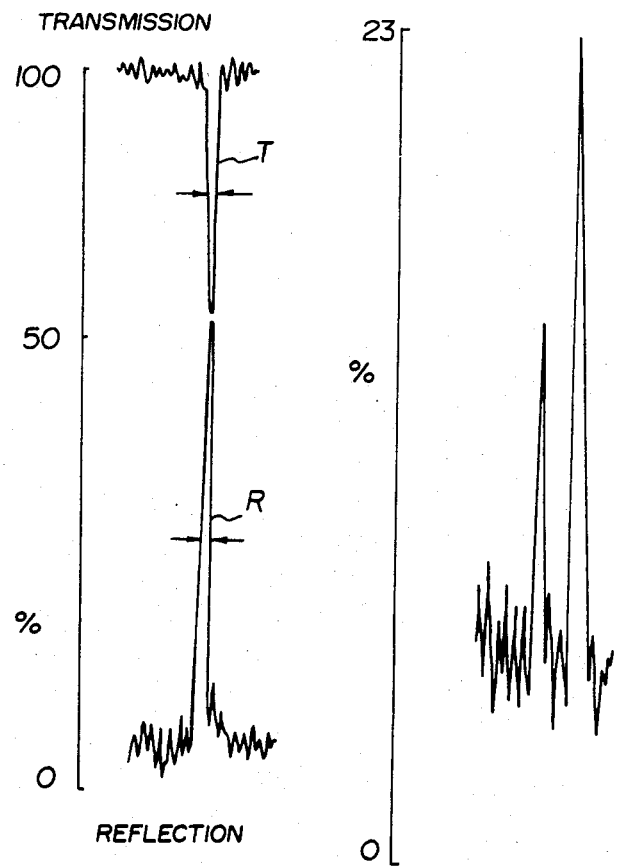
FIG. 3
FIG. 5

OPTICAL FIBER REFLECTIVE FILTER

BACKGROUND OF THE INVENTION

This invention is directed to reflective filters and in particular to reflective filters made of optical fibers having light induced refractive index perturbations.

In present optical fiber communication systems only a small fraction of the total available information carrying capacity is utilized. More effective use of the available bandwidth is obtained by implementing optical communication systems employing wavelength division multiplexing (WDM). The implementation of WDM systems requires components for wavelength multiplexing and demultiplexing such as optical combiners, wavelength selective filters and reflectors.

Two general approaches are available for providing wavelength selective devices for fiber optic WDM systems-microoptics and thin-film integrated optics. In the microoptic approach, miniaturized versions of the standard optical components (prisms, gratings, lens, beamsplitters, interference filters, etc.) are fabricated and used to carry out WDM. Whereas in the thin-film integrated optic approach the optical components are fabricated in planar thin films using suitable deposition techniques.

The microoptic approach is a straightforward extension of present optical component technology to small sizes to be compatible with the optical fiber size. Since the fabrication techniques are usually labour intensive and not easily adapted to mass production, the component cost is high. In addition the wavelength selective components such as prisms and gratings have low spectral resolution thus severely restricting the number of different wavelengths that can be multiplexed or demultiplexed on a single fiber.

In the thin-film integrated optic approach the fabrication process for the components is amenable to large scale production resulting in a low component costs. The principal limitation of this approach is the high optical loss occurring in planar thin-films which limits the effective length of the devices to less than 1 cm and thus places a restriction on the optical resolution of the devices. A further difficulty is the optical mode mismatch that results when coupling light from a waveguide with circular geometry into one with rectangular geometry and vice versa.

SUMMARY OF THE INVENTION

It is therefore an object of this invention to provide a wavelength selective reflective filter suitable for use in optical fiber systems.

This and other objects are achieved in an optical reflective filter comprising a photosensitive optical fiber having a cladding and a core including germanium wherein refractive index perturbations are light induced in the region of the guided light. The periodicity of the perturbations may be substantially constant, they may vary along the length of the fiber or they may consist of a series of perturbations, each series of which are substantially constant. The periodicity of the perturbations is such as to reflect light in the 400 nm to 550 nm range particularly for fibers having a germanium doped silica core or a germania core. The fiber may also preferably be single or low order mode fibers. A tunable filter includes apparatus for stretching the filter along its length.

To make the filters, from a photosensitive fiber having a cladding and a core, a predetermined coherent light beam is transmitted through the fiber in one direction and reflected back through the fiber in the other direction to interfere with the first transmitted beam to form a stable interference pattern so as to produce refractive index perturbations in the fiber.

These two steps may be carried out while the fiber is subjected to a temperature gradient or a tension gradient along its length to produce a broadband reflective filter. The steps may also be carried out while the fiber is subjected to a substantially constant tension along its length which will produce a narrowband filter having a reflective band centered at a frequency other than the frequency of the predetermined light beam when the fiber tension is subsequently removed. Also, the steps may be repeated using two or more different light beams or two or more different tensions on the fiber to produce a multiband reflective filter.

BRIEF DESCRIPTION OF THE DRAWINGS

In the drawings:

FIG. 3 illustrates typical reflection and transmission spectra for the filter;

FIG. 4 illustrates a tunable filter; and

FIG. 5 illustrates the response of a filter having two reflection peaks.

DESCRIPTION OF THE PREFERRED EMBODIMENTS

The optical reflective filter in acoordance with the present invention consists of a low-mode-number fiber. The fiber, which is photosensitive, particularly in the blue to green range of 400 nm to 550 nm, includes a cladding and a core. The core can be made of Ge-doped silica or germania. Within the filter, refractive index perturbations are light induced in the guided light region of the fiber. The periodicity of the perturbations may be constant which provides a filter reflective to a narrow bandwidth centered at a particular frequency. The periodicity of the perturbations may vary along the filter length, either increasing or decreasing along the length of the filter to provide a wide reflective band. Finally, the perturbations may be made up of a series of perturbations with each of the series having a different constant periodicity to provide a filter reflective to a series of narrow bandwidths centered at particular frequencies.

The filter, in accordance with the present invention, may be tuned by stretching the fiber filter along its length thereby changing the periods of the perturbations and therefore the filter resonance frequency.

Figure 1:
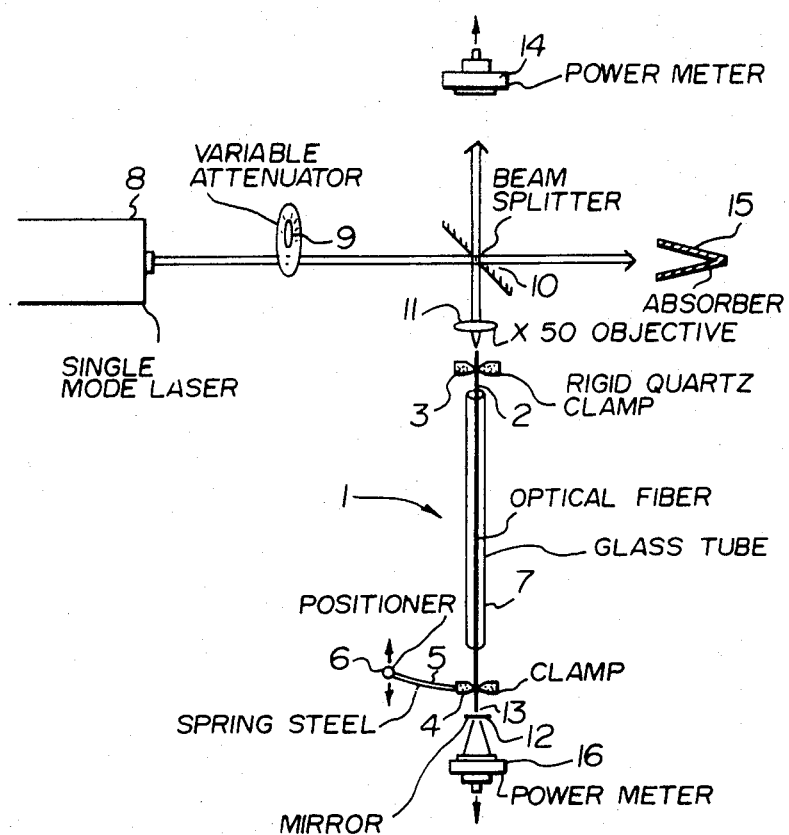
FIG. 1 illustrates apparatus for the formation of filters in accordance with the present invention.

FIG. 1 illustrates a method by which the filters in accordance with the present invention may be made. The entire apparatus is preferably mounted on a floating optical bench in order to ensure mechanical stability. The apparatus includes a device 1 for holding the photosensitive fiber 2 to be processed. This holding device 1 should maintain the fiber 2 rigid during processing as any movement in the fiber 2 may disturb the proper inducement of the perturbations within the fiber 2. The holding device 1 may include a cylindrical spool around which the fiber 2 may be wrapped under uniform tension or a conical spool around which the fiber 2 may be wrapped under a progressively increasing tension. The holding device 1, as illustrated in FIG. 1, includes a first quartz clamp 3 which is mounted so that it can be accurately positioned piezoelectrically to permit precise coupling of a light beam to the fiber 2. The other end of the fiber 2 is clamped in further quartz jaws 4 attached to a section of spring steel 5, which serves to apply the desired amount of longitudinal stress by a positioner 6. The spring 5 also serves to reduce the detuning effects of vibrations that may produce relative motion between the two end mounts 3 and 4. Any motion is translated into spring flexure rather than changes in tension on the fiber 2, as would occur with an inflexible mount. The quartz tube 7 surrounds the fiber 2 and shields it from thermal effects that would be induced by air currents around the fiber 2. Shielding against thermal effects and the minimization of tension changes is necessary because the characteristics of the filters may be affected by either of these parameters.

The apparatus further includes a laser source 8 for providing a light beam oscillating on a single predetermined frequency in the blue-green range of 400 nm to 550 nm. The coherence length of the source 8 is sufficiently long to enable the production of stable interference patterns over a predetermined filter length. The source 8 should either be controllable to oscillate at different desired frequencies or a number of sources may be used to provide the desired frequencies. The laser 8 beam travels through a variable attenuator 9, is deflected through 90° by a 50% beam splitter 10 and is launched into the fiber 2 by a microscope objective 11. The apparatus may further include a partially reflecting mirror 12 positioned at the end of the fiber 2 to reflect at least part of the beam back into the fiber 2. However, instead of using a mirror 12, the 4% Fresnel reflection off of the fiber 2 end 13 cleaved at right angles may be used as a reflector. The 50% beam splitter 10 provides an output path along which a backreflected beam from the fiber 2 can be monitored by a power meter 14. Isolation of the source 8 from the destabilizing effects of a backreflected beam is provided by the attenuator 9 and the 50% splitter 10. This isolation could also be provided using other means such as a Faraday Isolator.

During the process, the input beam power to the fiber 2 may be monitored at absorber 15 and the beam transmission through the fiber 2 may be measured by power meter 16.

In operation, once the fiber 2 is positioned, the light beam from source 8 is launched into the fiber 2. This beam is reflected by the mirror 12 or the end of the fiber 13 back through the length of the fiber 2. The reflected beam interferes with the primary beam and produces a periodic standing wave pattern or interference pattern in the fiber which, it is presumed, induces the filter formation process. It is postulated that the standing-wave pattern induces a periodic perturbation of the refractive index of the fiber and in particular of the core, along the length of the exposed fiber. The origin of the mechanism producing the photo-induced refractive index change in the fiber is not known, however it is concluded that the reflectivities are due to index change rather than an absorption mechanism such as the formation of color centers since in the filters fabricated, the reflectivities are generally in the range of 60 to 90%. These reflectivities are not possible by a mechanism other than a refractive index effect in which the refractive index change would be in the order of $10^{-6}$ to $10^{-5}$.

The above effect or mechanism has been observed under a variety of conditions using different light intensities, light wavelengths and fibers containing germanium. Photo-induced refractive index changes have been observed in Ge-doped silica fiber using an argon laser operating respectively in the blue-green region at 457.9 nm, 488.0 nm, 496.5 nm, 501.7 nm and 514.5 nm. A variety of fiber types have also been studied. A comparison of the exposure times of two fibers of approximately the same core diameter (2.5 μm) and with numerical apertures (NA) of 0.1 and 0.22 respectively indicated that the fiber with the larger Ge doping (NA=0.22) was more sensitive. The photo-induced refractive index effect has also been observed in fibers with a pure germania core of diameter 10 μm. Filters in lengths from 1 cm to over 1 m have been made. The length of the filter is limited only by the coherence length of the laser. Finally, filters have been made wherein the fiber carries from 1 W of single mode light to as low as 20 milliwatts of single mode light.

Figure 2:
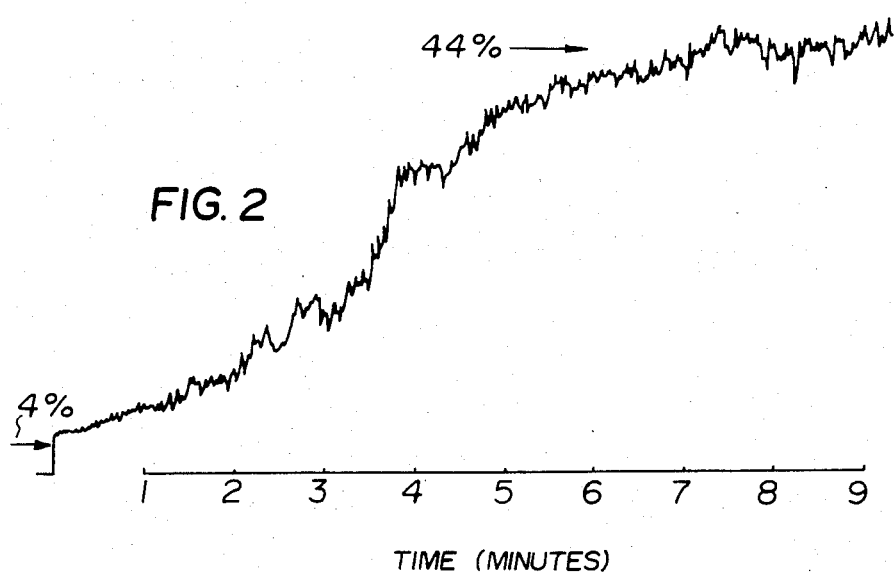
FIG. 2 illustrated the build-up of reflectivity in the optical filter.

FIG. 2 illustrates the build-up in time of the reflectivity of a 1 m strand of Ge-doped silica core optical fiber having an NA of 0.1 and core diameter of 2.5 μm. The input to the fiber is 1 W of single mode 488.0 nm light from an argon laser. Initial reflection from the end 13 of the fiber 2 is due to the fiber end Fresnel back reflection. As can be seen in FIG. 2, the reflectivity of the fiber increases to 44% in approximately 9 minutes. The reflectivity of the filter is actually much greater since not all light incident on the fiber is coupled into the fiber.

Typical reflection R and transmission T spectra for a 62 cm fiber filter are illustrated in FIG. 3. The fiber has a Ge-doped silica core of 2.5 μm diameter and a fiber NA of 0.22. The filter was formed using a 514.5 nm argon laser with the fiber carrying 50 mW. The filter response is a single narrow peak centered at 514.5 nm in both reflection and transmission with a bandwidth of approximately 200 MHz at half maximum.

One method by which a filter in accordance with the present invention can be tuned is illustrated in FIG. 4. Basically, it may consist of a holding device 21 similar to the holding device 1 illustrated in FIG. 1. The holding device 21 includes a first rigid clamp 23 for holding one end of the filter 22 and a second moveable clamp 24 is mounted on a spring 25 to maintain the filter in tension with a positioner 26 for stretching the filter 22 a desired amount as determined by a position sensor 28. Thus, as the filter 22 is stretched, its resonant frequency decreases from its rest resonant frequency since the distance between the perturbations in the filter 22 increases.

In the absence of thermal effects and with the filter 22 stretching uniformly, the shift in resonant frequency Δv as a function of stretch length L is given by $$\Delta v = -\left(1 + \frac{1}{n}\frac{\partial n}{\partial s}\right)\frac{c}{\lambda}\frac{\Delta L}{L} \quad (1)$$

where
  n is the index of refraction of the core,
  c is the speed of light in a vacuum,
  λ is the vacuum wavelength of illumination, and
  s is strain.
It has been determined that the elasto-optic coefficient of silica $$\left(\frac{1}{n} \frac{\partial n}{\partial s}\right) = -0.29$$

and since $c = 3.0 \times 10^8$ m/s, then $$\Delta v = -2.3 \times 10^8 \frac{\Delta L}{\lambda L} \quad (2)$$

In the case that the bandwidths b.w. of these filters are limited by the fiber length, the bandwidth may be determined by $$b.w. = \frac{c}{2nL} \quad (3)$$

Therefore, a 1 m, a 62 cm and a 33.5 cm length filter will have a bandwidth of 102 MHz, 165 MHz and 306 MHz respectively.

One method of forming a complex filter is to superimpose two or more simple reflection filters in the same fiber. FIG. 5 shows the filter response that was obtained by illuminating the fiber consecutively with different wavelengths. The separation of the two peaks in FIG. 5 is 760 MHz. This small change in frequency was obtained by adjusting the angle of tilt of the intracavity mode-selecting etalon of the argon laser. This capability of over-writing, without erasure of previously written filters is useful in the formation of such devices as comb filters for wavelength division multiplexed systems. This same method of forming a complex filter may be used to form a reflective filter responsive to infrared frequencies. A first set of perturbations is produced by light in the UV region and a second set is produced by light in the visible region whereby the beat frequency of these widely separated frequency is in the infrared region.

As described above with respect to FIG. 1, a uniform longitudinal tension is placed on the fiber 2 by spring 5 as the filter is formed. The free resonant frequency of the filter will then be higher than the frequency of the source 8. However, if a longitudinal tension gradient is placed on the fiber such as by wrapping it around a conical spool, the filter will not have a specific resonant frequency but will have a type of broad-banded response since the periodicity of the perturbations varies along the length of the filter. This same type of filter can also be obtained by applying a temperature gradient along the length of the fiber while the filter is being formed.

We claim:

1. An optical refective filter comprising a photosensitive optical fiber having a cladding and a core including germanium and having a minimum numerical aperture of 0.1 wherein refractive index perturbations are light induced in the region of the guided light.

2. An optical reflective filter as claimed in claim 1 wherein the periodicity of the perturbations is substantially constant along the length of the filter.

3. An optical reflective filter as claimed in claim 1 wherein the periodicity of the perturbations varies along the length of the filter.

4. An optical reflective filter as claimed in claim 1 wherein the perturbations consist of at least two series of perturbations, each series of perturbations having a predetermined constant periodicity along the length of the filter.

5. An optical reflective filter as claimed in claim 1 wherein the core consists of germanium doped silica.

6. An optical reflective filter as claimed in claim 1 wherein the core consists of germania.

7. An optical reflective filter as claimed in claim 1 wherein the periodicity of the perturbations is such as to reflect light in the wavelength range of 400 nm to 550 nm.

8. An optical reflective filter as claimed in claim 1 which further includes means for stretching the filter along its length.

9. An optical reflective filter as claimed in claim 1 wherein the fiber is a single mode fiber.

10. An optical reflective filter as claimed in claim 1 wherein the fiber is a single mode fiber.

11. A method of making an optical reflective filter from a photosensitive fiber having a cladding and a core comprising the steps of:
   (a) transmitting a predetermined coherent light beam through the fiber in one direction; and
   (b) reflecting the light beam back through the fiber in the other direction to interfere with the launched beam to form a stable interference pattern so as to produce refractive index perturbations in the fiber.

12. A method as claimed in claim 11 which includes the step of subjecting the fiber to a constant longitudinal tension during steps (a) and (b).

13. A method as claimed in claim 11 which includes the step of protecting the fiber from temperature fluctuations during steps (a) and (b).

14. A method as claimed in claim 13 which further includes the step of subjecting the fiber to a temperature gradient along its length during steps (a) and (b).

15. A method as claimed in claim 11 which includes the step of subjecting the fiber to a longitudinal tension gradient along its length during steps (a) and (b).

16. A method as claimed in claim 11 wherein the fiber is a low-order mode fiber with a numerical aperture greater than 0.1 and having a germanium doped silica core, and the light beam has a wavelength in the range of 400 nm to 550 nm.

17. A method as claimed in claim 11 which includes the repetition of steps (a) and (b) with one or more different coherent light beams.

* * * * *